US009369564B2

(12) United States Patent
Crosswy et al.

(10) Patent No.: US 9,369,564 B2
(45) Date of Patent: *Jun. 14, 2016

(54) PORTABLE COMPUTING DEVICE FOR WIRELESS COMMUNICATIONS AND METHOD OF OPERATION

(75) Inventors: William C. Crosswy, The Woodlands, TX (US); Matthew J. Wagner, Houston, TX (US); Robin Castell, Spring, TX (US); Craig Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 870 days.

This patent is subject to a terminal disclaimer.

(21) Appl. No.: 12/972,592

(22) Filed: Dec. 20, 2010

(65) Prior Publication Data

US 2011/0093922 A1 Apr. 21, 2011

Related U.S. Application Data

(63) Continuation of application No. 10/861,846, filed on Jun. 4, 2004, now Pat. No. 7,881,267.

(51) Int. Cl.
*H04W 88/10* (2009.01)
*H04M 1/725* (2006.01)
*H04W 88/06* (2009.01)
*H04W 80/00* (2009.01)
(Continued)

(52) U.S. Cl.
CPC ............ *H04M 1/7253* (2013.01); *H04W 88/06* (2013.01); *H04W 88/10* (2013.01); *H04W 80/00* (2013.01); *H04W 84/12* (2013.01); *H04W 84/22* (2013.01); *H04W 88/02* (2013.01); *H04W 88/021* (2013.01); *H04W 88/08* (2013.01); *H04W 88/16* (2013.01)

(58) Field of Classification Search
None
See application file for complete search history.

(56) References Cited

U.S. PATENT DOCUMENTS 6,147,986 A 11/2000 Orsic
6,487,396 B1 * 11/2002 Sassi ............................ 455/90.1
(Continued)

FOREIGN PATENT DOCUMENTS

| CA | 2491440 | 1/2004 |
|---|---|---|
| DE | 10152855 | 5/2003 |

(Continued)

OTHER PUBLICATIONS

Daniel L. Lough, et al., "A Short Tutorial on Wireless LANs and IEEE 802.11." IEEE., internet: http://www.computer.org/students/looking/summer97/ieee802.htm, Oct. 3, 2003, pp. 1-5.

(Continued)

*Primary Examiner* — Timothy J Weidner
(74) *Attorney, Agent, or Firm* — HP Inc. Patent Department

(57) ABSTRACT

In one embodiment of the present invention, a portable computing device for wireless communications comprises a first network interface for communicating with a public wireless wide area network (WWAN), a second network interface for communicating with a private wireless local area network (WLAN), and a processor executing under control of software instructions, the software instructions defining a gateway protocol, the gateway protocol establishing the portable computing device as an access point within the private WLAN after the wireless presence on the public WWAN is established.

20 Claims, 3 Drawing Sheets

(51) Int. Cl.
H04W 84/12 (2009.01)
H04W 84/22 (2009.01)
H04W 88/02 (2009.01)
H04W 88/08 (2009.01)
H04W 88/16 (2009.01)

(56) References Cited

U.S. PATENT DOCUMENTS

| | | | |
|---|---|---|---|
| 6,515,974 B1* | 2/2003 | Inoue et al. | 370/331 |
| 6,684,157 B2 | 1/2004 | Barman et al. | |
| 6,954,616 B2 | 10/2005 | Liang et al. | |
| 7,039,027 B2 | 5/2006 | Bridgelall | |
| 7,149,197 B2* | 12/2006 | Garahi | H04W 88/02 370/328 |
| 7,155,247 B2 | 12/2006 | Busch | |
| 7,206,294 B2 | 4/2007 | Garahi et al. | |
| 7,221,666 B2* | 5/2007 | Inoue et al. | 370/338 |
| 7,236,777 B2 | 6/2007 | Tolhurst | |
| 7,327,705 B2* | 2/2008 | Fletcher et al. | 370/331 |
| 7,382,771 B2* | 6/2008 | Leblanc | H04L 29/06 370/328 |
| 7,453,844 B1* | 11/2008 | Lee et al. | 370/329 |
| 2002/0085516 A1 | 7/2002 | Bridgelall | |
| 2003/0063593 A1* | 4/2003 | Koyanagi et al. | 370/338 |
| 2004/0034219 A1 | 2/2004 | Leblanc | |
| 2004/0125812 A1 | 7/2004 | Kao et al. | |
| 2004/0184466 A1 | 9/2004 | Chang | |
| 2004/0202120 A1 | 10/2004 | Hanson | |
| 2004/0209632 A1 | 10/2004 | Link et al. | |
| 2005/0074019 A1 | 4/2005 | Handforth et al. | |
| 2005/0076054 A1 | 4/2005 | Moon et al. | |
| 2005/0181779 A1 | 8/2005 | Jones et al. | |
| 2005/0238046 A1 | 10/2005 | Hassan et al. | |
| 2007/0091845 A1 | 4/2007 | Brideglall | |
| 2007/0115950 A1 | 5/2007 | Karaoguz et al. | |

FOREIGN PATENT DOCUMENTS

| | | |
|---|---|---|
| DE | 20310166 | 11/2003 |
| DE | 10233606 | 2/2004 |
| KR | 20030068377 | 8/2003 |
| WO | WO-0176154 | 10/2001 |
| WO | WO-03101025 | 12/2003 |
| WO | WO-2004034219 | 4/2004 |
| WO | WO-2004070970 | 8/2004 |

OTHER PUBLICATIONS

German Office Action dated Jul. 17, 2007, German Application No. 10 2005 021315.4-31, 5 pp.

Japanese Office Action dated Nov. 2, 2007, Japanese Application No. 2005-147532 2 pp.

Nokia Connecting People, Nokia.com. "Bluetooth," internet: http://www.nokia.com/nokia/0..397.00.html, Apr. 1, 2004, p. 1.

Nokia, "Bluetooth Technology Overview." Version 1.0. Apr. 4, 2003, internet: Forum.Nokia.com, pp. 1-24.

USPTO Final Office Action, date mailed Sep. 10, 2009, U.S. Appl. No. 10/861,846, pp. 21.

USPTO Notice of Allowance, date mailed Aug. 9, 2010, U.S. Appl. No. 10/861,846, pp. 9.

USPTO Notice of Allowance, date mailed Oct. 1, 2010, U.S. Appl. No. 10/861,846, pp. 8.

USPTO Office Action, date mailed Feb. 21, 2008, U.S. Appl. No. 10/861,846, pp. 19.

USPTO Office Action, date mailed Apr. 15, 2010, U.S. Appl. No. 10/861,846, pp. 11.

USPTO Office Action, date mailed Mar. 3, 2009, U.S. Appl. No. 10/861,846, pp. 15.

USPTO Office Acton, date mailed Sep. 15, 2008, U.S. Appl. No. 10/861,846, pp. 6.

USPTO Office Action, date mailed Jun. 27, 2008, U.S. Appl. No. 10/861,846, pp. 6.

USPTO Office Action, dated mailed Oct. 9, 2007, U.S. Appl. No. 10/861,846, pp. 16.

Yujin lim, et al., "Performance Evaluation of the Bluetooth-based Public Internet Access Point,", IEEE, 2001, pp. 643-648.

* cited by examiner

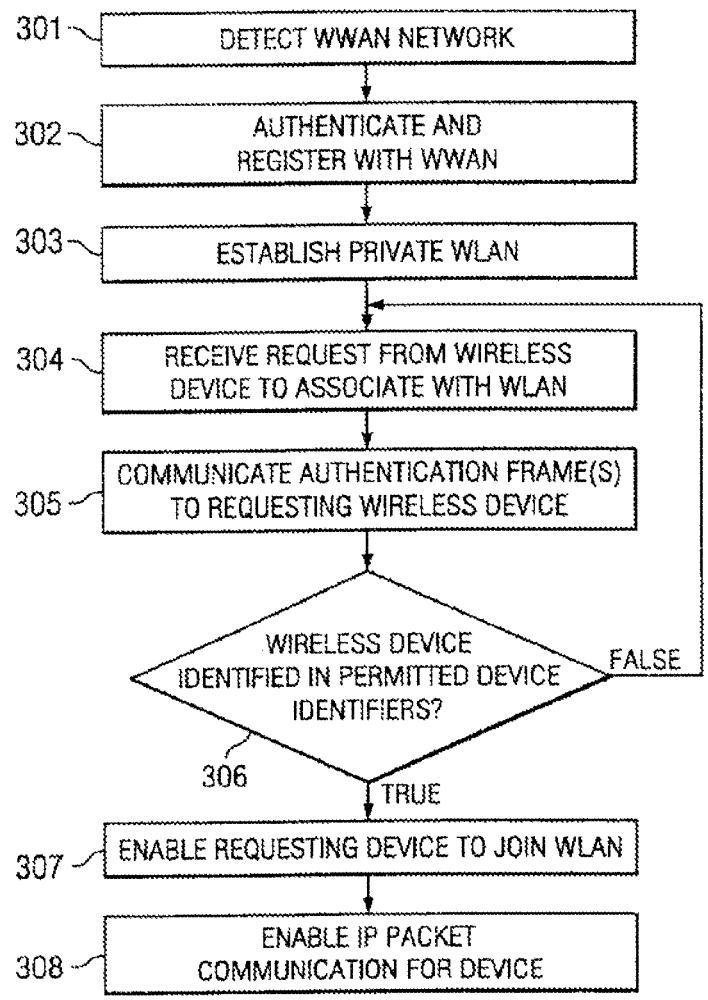

PORTABLE COMPUTING DEVICE FOR WIRELESS COMMUNICATIONS AND METHOD OF OPERATION

CROSS REFERENCE TO RELATED APPLICATIONS

This application claim is a continuation of U.S. patent application Ser. No. 10/861,846 filed Jun. 4, 2004 now U.S. Pat. No. 7,881,267.

FIELD OF THE INVENTION

The present invention is directed to wireless communications.

DESCRIPTION OF RELATED ART

A number of wireless communication protocols enable mobile or portable computing devices to conduct network communications. For example, wireless fidelity ("Wi-Fi") products enable wireless communication, often referred to as wireless local area networks (WLAN), using the IEEE 802.11b protocol. The 802.11b protocol defines the physical and medium access control layers of the communication protocol. The physical layer refers to characteristics associated with the wireless transmission of data (i.e., using direct spread spectrum processing, frequency hopping, or infrared (IR) pulse modulation for the 802.11b standard). The medium access control layer refers to the techniques that maintain order within the shared communication medium to prevent networked devices from interfering with each other's communications.

According to the 802.11b communication protocol, two types of wireless communication networks are possible. In the fast type, an "ad-hoc" wireless communication network is formed. Specifically, when a number of wireless-capable devices are within communication range, the wireless communication devices "elect" one of the devices as the base station and the other devices act as slaves to the base station. The base station manages the communication within the wireless network. In the second type, an infrastructure model is employed wherein at least one access point is employed. An access point is a fixed wireless capable device that is also coupled to a wired network. The wired network may enable communication with other resources such as file servers, printers, and/or the like or may enable communication through other larger networks such as the Internet.

Another wireless communication protocol is the general packet radio service (GPRS) protocol. Communication using the GPRS protocol occurs through public wireless cellular systems (e.g., global system for mobile (GSM) communications networks) to provide wireless wide area networks (WWAN). A device that attempts to communicate using the GPRS protocol establishes its presence within a cell of an appropriate network by registering with the network through a base station. The base station is coupled to the cellular infrastructure and routes packets to and from the wireless device.

The foregoing WLANs and WWANs provide various different features and advantages. For example, WLAN interfaces are often relatively inexpensive and use low power, facilitating their implementation in a wide variety of devices, including handheld computers, portable computers, printers, dedicated-purpose devices, etcetera. WWAN interfaces provide extended range communication links, such as throughout a metropolitan area, facilitating access to a large number of resources and information. Such resources and information are unavailable to users of a WLAN without the use of one of the aforementioned fixed access points employing a wired network connection.

SUMMARY

In one embodiment of the present invention, a portable computing device for wireless communications comprises a rust network interface for communicating with a public wireless wide area network (WWAN), a second network interface for communicating with a private wireless local area network (WLAN), and a processor executing under control of software instructions, the software instructions defining a gateway protocol, the gateway protocol establishing the portable computing device as an access point within the private WLAN after the wireless presence on the public WWAN is established.

In another embodiment of the present invention, a method for wireless communications comprises detecting entry into a service area of a public wireless wide area network (WWAN) by a portable computing device, and establishing a private wireless local area network (WLAN) by the portable computing device, wherein the portable computing device performs at least one access point service for said private WLAN.

In another embodiment of the present invention, a system for wireless communications comprises, means for registering with a public wireless wide area network (WWAN) to transmit and receive communication packets after detection of entry into a service area of the public WWAN and means for establishing access point services for a private wireless local area network (WLAN), wherein the means for establishing operates in response to the means for registering.

BRIEF DESCRIPTION OF THE DRAWINGS

FIG. 3 depicts an example flowchart for managing wireless communications according to one representative embodiment.

DETAILED DESCRIPTION

Figure 1A:
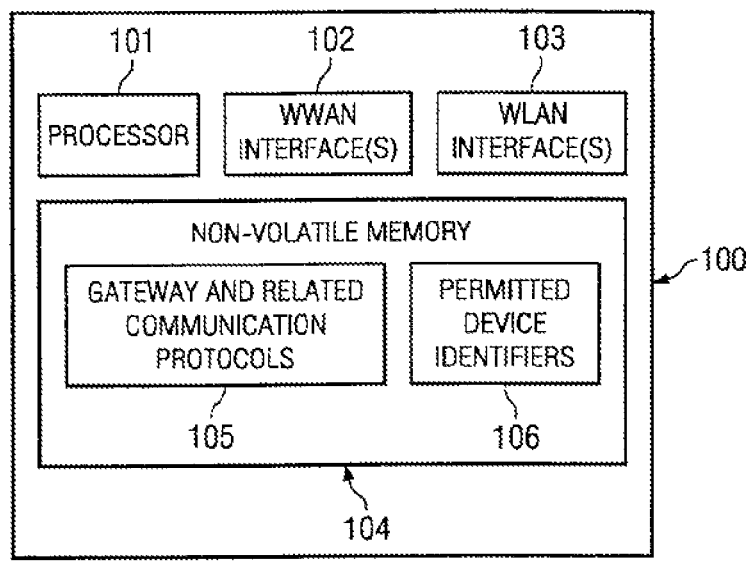
FIGS. 1A and 1B depict example portable computing devices according to representative embodiments.

Referring now to the drawings, FIG. 1A depicts portable computing device 100 according to representative embodiments. Portable computing device 100 includes processor 101, wireless wide area network (WWAN) interface(s) 102, and wireless local area network (WLAN) interface(s) 103. Suitable commercially available WWAN interfaces include, but are not limited to GPRS interfaces, code division multiple access (CDMA) 1×RTT interfaces, CDMA 1×EVDO interfaces, 802.16 (WiMax) interfaces, wireless broadband interfaces, and the like. Suitable commercially available WLAN interfaces include, but are not limited to 802.11b interfaces, 802.11a interfaces, 802.11g interfaces. For the purposes of the following description, the term WLAN is also used to refer to other communication mechanisms possessing limited communication ranges, e.g., personal area Bluetooth networks, personal area Ultra Wideband (UWB) networks, and/or the like.

Portable computing device 100 may be implemented in the form of a personal digital assistant (FDA), a notebook computer, or other portable computing platform. Suitable commercially available PDAs that comprise WWAN and WLAN interfaces include iPAQ™ Pocket PCs available from Hewlett-Packard Company, without implementation embodiments of the present invention such PDAs do not provide connectivity between the WWAN and WLAN interfaces. Alternatively, cellular telephones or other wireless devices that include appropriate processing capabilities and wireless interfaces may be used to implement representative embodiments.

Processor 101 operates under the control of executable instructions or code. The executable instructions or code may be stored in non-volatile memory 104 which is any suitable computer-readable medium. For example, gateway and related communication protocols 105 are stored in non-volatile memory 104. When portable computing device 100 is initially located within a cell or service area of a WWAN, portable computing device 100, under the control of protocols 105, attempts to establish a presence in the WWAN. The establishment of a presence within the WWAN may include detecting a digital control channel associated with the WWAN. The digital control channel enables portable computing device 100 to communicate with a base station associated with the cell or service area. By communicating with the base station, portable computing device 100 registers with routing services of the WWAN. For example, portable computing device 100 registers its location with a visiting location registry and/or a home location register to facilitate the routing of packets to portable computing device 100 according to the mobile Internet Protocol as an example. After registering its location within the WWAN, portable computing device 100 may communicate with various resources via the Internet using the GPRS functionality of the WWAN.

After portable computing device 100 establishes a presence within a WWAN, portable computing device 100, under the control of protocols 105, establishes a WLAN. In one embodiment, portable computing device 100 establishes itself as an "access point" according to the 802.11b standard. Portable computing device 100 may access a cache of permitted device identifiers 106 to limit access to the established WLAN. Furthermore, portable computing device 100 provides gateway functionality to other wireless communication devices within the established WLAN. Specifically, portable computing device 100 receives packets from the wireless communication devices in the WLAN and routes the packets to resources available via the Internet using the WWAN. Portable computing device 100 provides other communication functionality to facilitate the routing of packets such as network address translation (NAT), dynamic host configuration protocol (DHCP), firewall functionality, virtual private networking (VPN) functionality, content filtering functionality, and/or the like.

Figure 1B:
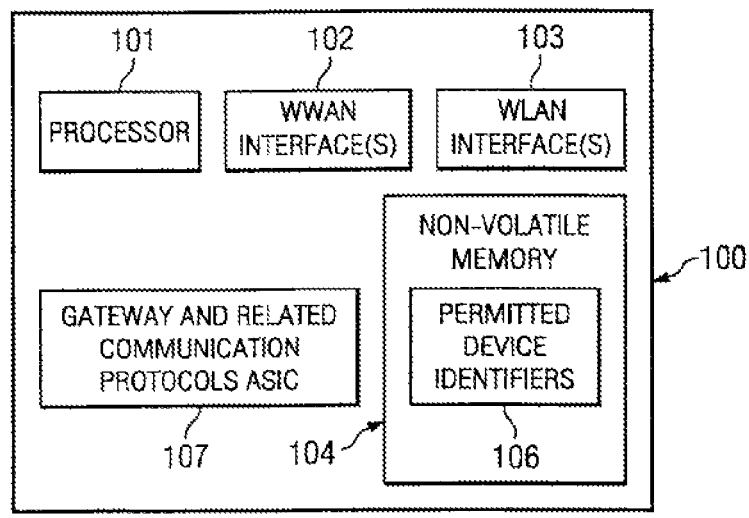

Although the functionality of protocols 105 has been described as being implemented using software instructions executed by processor 101, other embodiments may employ other implementations. For example, a suitable application specific integrated circuit (ASIC) or circuits (shown as ASIC 107 in FIG. 1B) may be used to implement protocols 105 according to one representative embodiment. Also, although embodiments are described as using a single WLAN network, protocols 105 may control multiple WLAN interfaces 102 simultaneously. For example, protocols 105 may establish a Bluetooth WLAN and a 802.11b WLAN operating in the same local area.

Figure 2:
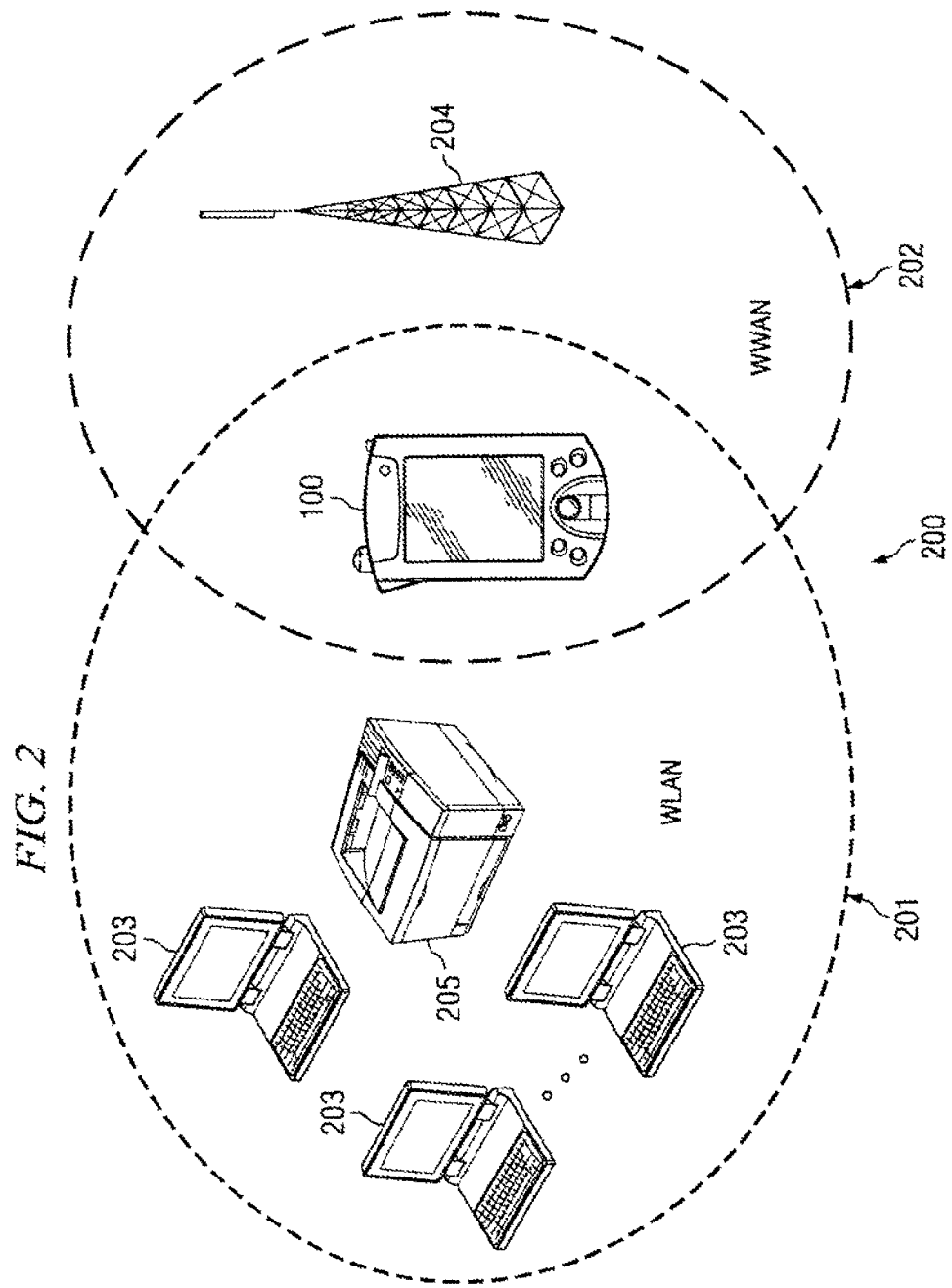
FIG. 2 depicts an example communication system according to one representative embodiment.

FIG. 2 depicts communication system 200 according to one representative embodiment. Communication system 200 comprises portable computing device 100. Portable computing device 100 is established within a cell or service area of WWAN 202. Portable computing device 100 communicates with resources on the Internet using WWAN infrastructure 204.

Portable computing device 100 acts as an access point for WLAN 201 to thereby provide an access point that is neither fixed in location (i.e., is portable) nor relies on wireline links for wide area communications. Furthermore, portable computing device 100 may authenticate or otherwise limit which devices may communicate within WLAN 201 to establish a private network. Wireless devices 203 within WLAN 201 may be implemented using a variety of computing devices such as desktop computers, laptop computers, personal digital assistants, and/or the like. Wireless devices 203 may include integrated WLAN interfaces or removable WLAN cards. Wireless devices 203 may communicate with resources available on the Internet by routing packets through portable computing device 100. Wireless devices 203 may communicate with each other using the wireless management functionality of portable computing device 100. Alternatively, wireless devices 203 may communicate with shared resources (e.g., printer 205) using the wireless management functionality of portable computing device 100.

FIG. 3 depicts a flowchart for managing wireless communications according to one representative embodiment by establishing a gateway protocol useful in facilitating WWAN connectivity with respect to a WLAN implementation. In block 301, a WWAN network is detected by mobile computing device 100. For example, mobile computing device 100 detects the digital control channel of a GSM cellular network or other network control channel. In block 302, mobile computing device 100 authenticates and registers with the WWAN network. The authentication may occur by communicating an electronic serial number, mobile serial number, challenge and response packets, and/or the like. After authentication and registration, mobile computing device 100 is established within the WWAN and is ready to communicate packets. Accordingly, the illustrated embodiment provides autonomous data interfacing with the WWAN when detected, or as otherwise desired by a user, thereby establishing a wireless presence on the WWAN.

In block 303, a private WLAN is established by mobile computing device 100. For example, mobile computing device 100 may begin broadcasting a beacon frame. In the 802.11b standard, the beacon frame enables wireless communication devices to locate and join a "basic services set" or (a set of devices communicating according to the wireless protocol). Additionally, mobile computing device 100 may respond to "probe request" frames according to the 802.11b standard. The probe request enables wireless communication devices to identify an access point associated with an infrastructure basic service set. Probe requests are employed to enable a wireless device to join an infrastructure basic services set in a more efficient manner than waiting for the transmission of a beacon frame.

In block 304, a request, such as may include an identifier of a requesting wireless device, is received by mobile computing device 100 from a wireless device to join the WLAN. In block 305, at least one authentication frame is communicated between mobile computing device 100 and the requesting wireless device. In the 802.11b standard, authentication is performed using a multi-frame exchange using an authentication algorithm number, authentication transaction sequence number, a status code, and challenge text. In block 306, a logical determination is made to determine whether the requesting wireless device is identified within permitted device identifiers 106, such as by comparing an identifier of a requesting wireless device with identifiers stored in a memory of mobile computing device 100. If not, the wireless device is not allowed to join the WLAN and the process flow returns to block 304 to receive further requests. If the wireless device is identified within permitted device identifiers 106, the process flow proceeds to block 307 where the requesting wireless device is allowed to join the WLAN.

In block 308. Internet Protocol (IP) packet communication for the wireless device is enabled. For example, after joining the WLAN, the wireless device may broadcast a DHCP discovery packet. Procotols 105 of mobile computing device 100 may comprise a DHCP server that responds to broadcast discovery packets. Specifically, the DHCP server "leases" an IP address to the wireless device to enable packet communication. Using the assigned IP address, mobile computing device 100 routes packets to and from Internet resources for the wireless communication device and/or other devices of the WLAN using the WWAN, thereby providing gateway functionality such that mobile computing device 100 is established as an access point on said WLAN after a wireless presence on the WWAN is established. Mobile computing device 100 may perform other functionality such as network address translation, firewall filtering, virtual private networking, content filtering, and/or the like.

One or more of the foregoing functions may be performed in an order different than that set forth with respect to the embodiment of FIG. 3 described above. For example, one or more functions may be performed simultaneously, such as to provide a desired level of reliability and/or responsiveness, according to embodiments of the invention.

Representative embodiments may be used for a variety of applications. For example, portable computing device 100 may be used by groups of professionals that perform services in remote locations. For example, mobile accounting teams frequently set up temporary offices in facilities belonging to their clients. Mobile computing device 100 may be used by such teams to establish a local area network for the team members at client facilities. Moreover, mobile computing device 100 may be used by the teams to communicate with servers associated with the main office of the mobile teams. Representative embodiments offer a number of advantages in this type of situation. By employing representative embodiments, the local area network can be set up and removed in an efficient manner without employing wired technology. Additionally, every device belonging to the team members does not necessarily possess the hardware used for WWAN communication. By providing the WWAN functionality within a limited number of mobile computing devices 100, management of user accounts associated with the public wireless network may be managed in an efficient manner.

What is claimed is:

1. A portable computing device for wireless communications, comprising:
    a first network interface to communicate with a public wireless wide area network (WWAN);
    a second network interface to communicate with a private wireless local area network (WLAN);
    a processor and software instructions that when executed by the processor defining a gateway protocol, said gateway protocol establishing said portable computing device as an access point within said private WLAN contemporaneous with a wireless presence of said portable computing device on said public WWAN, and using permitted device identifiers to limit access to the private WLAN, wherein to limit access comprises to compare the permitted device identifiers to a device identifier of a device requesting to join the private WLAN; and
    a dynamic host configuration protocol (DHCP) server;
    wherein said gateway protocol routes communication packets received from devices in said private WLAN through said public WWAN and routes packets received from said public WWAN to devices in said private WLAN.

2. The portable computing device of claim 1, comprising: the permitted device identifiers stored in memory of the portable computing device, wherein said gateway protocol autonomously establishes said wireless presence on said public WWAN when said portable computing device is located within said public WWAN.

3. The portable computing device of claim 1 wherein said first network interface is to communicate with a cellular system, wherein the portable computing device is a handheld computing device, wherein to limit access comprises the gateway protocol using the permitted device identifiers to limit which devices may join the private WLAN, and wherein the devices in the private WLAN comprise a first wireless device and a second wireless device in communication with a shared resource in the private WLAN via the portable computing device.

4. The portable computing device of claim 1 wherein said second network interface comprises a network interface implementing an 802.11 communication standard, wherein the portable computing device comprises a cellular telephone, a notebook computer, or a personal digital assistant (PDA), and wherein the devices in the private WLAN comprise a first device and a second device in contemporaneous communication with each other via the portable computing device.

5. The portable computing device of claim 1 wherein said gateway protocol is operable to:
    receive a request from a wireless device to associate with said private WLAN;
    authenticate the wireless device via a multi-frame exchange;
    compare a device identifier of the authenticated wireless device to the permitted device identifiers; and
    allow the authenticated wireless device to join the private WLAN in response to the device identifier being within the permitted device identifiers.

6. The portable computing device of claim 1 wherein said gateway protocol is operable to respond to probe requests from wireless devices and to authenticate wireless devices requesting to associate with the private WLAN, wherein the probe requests facilitate the wireless devices to identify the portable computing device as an access point in lieu of waiting for a beacon frame.

7. The portable computing device of 6 wherein authentication of said requesting wireless devices comprises comparing a device identifier of a requesting wireless device with the permitted device identifiers, the permitted device identifiers stored in non-volatile memory of said portable computing device.

8. A method for wireless communications, comprising:
    detecting entry into a service area of a public wireless wide area network (WWAN) by a portable computing device;
    establishing a private wireless local area network (WLAN) by said portable computing device while in the service area of said public WWAN, wherein said portable computing device performs at least one access point service for said private WLAN and limits access to the private WLAN via permitted device identifiers stored in memory of said portable computing device, wherein to limit access comprises to compare the permitted device identifiers to a device identifier of a device requesting to join the private WLAN; and routing packet traffic, by said portable computing device, between said public WWAN and said private WLAN.

9. The method of claim 8 further comprising:

establishing a presence within said WWAN by said portable computing device in response to said detecting entry wherein said gateway protocol, wherein routing packet traffic comprises routing packets received from devices in the private WLAN to the public WWAN and routing packets received from the public WWAN to the devices in the private WLAN.

10. The method of claim 8 further comprising:

leasing Internet protocol (IP) addresses to wireless devices in the private WLAN by said portable computing device to facilitate said routing packet traffic, wherein the portable computing device comprises a cellular telephone or a notebook computer, wherein to limit access comprises the gateway protocol using the permitted device identifiers to limit which devices may join the private WLAN.

11. The method of claim 8 further comprising:

receiving dynamic host configuration protocol (DHCP) requests from wireless devices in said private WLAN by said portable computing device, wherein the devices in the private WLAN comprise a first wireless device and a second wireless device in communication via the portable computing device to a shared resource comprising a printer in the private WLAN.

12. The method of claim 8 further comprising:

authenticating, by said portable computing device, an identity of a wireless device requesting to associate with said private WLAN, wherein the portable computing device is a handheld device.

13. The method of claim 12 further comprising:

comparing said authenticated identity of said requesting wireless device to the permitted device identifiers.

14. The method of claim 8 wherein said establishing a private WLAN comprises:

broadcasting a beacon frame to enable association of wireless devices with said private WLAN.

15. The method of claim 8 wherein said establishing a private WLAN comprises:

responding to probe requests to identify said portable computing device as an access point.

16. The method of claim 8 wherein said detecting entry comprises:

detecting a digital control channel associated with said service area.

17. A handheld computing device for wireless communications, comprising:

a first network interface for communicating with a public wireless wide area network (WWAN);

a second network interface for communicating with a private wireless local area network (WLAN);

device identifiers stored in memory to limit access for devices requesting to join the private WLAN; and a processor and software instructions that when executed by the processor define a gateway protocol, said gateway protocol establishing said handheld computing device as an access point within said private WLAN contemporaneous with wireless presence of the handheld computing device on said public WWAN, wherein said gateway protocol routes communication packets received from devices in said private WLAN through said public WWAN and routes packets received from said public WWAN to devices in said private WLAN.

18. The handheld computing device of claim 17, wherein the WWAN is a cellular system, and wherein the handheld computing device comprises a cellular telephone.

19. The method of claim 8 comprising:

establishing a presence within said public WWAN by said portable computing device, wherein said private WLAN by said portable computing device is established while said portable computing device is in said presence of said public WWAN;

receiving a request from a wireless device to associate with the private WLAN;

authenticating the wireless device via a multi-frame exchange;

comparing a device identifier of the authenticated wireless device to the permitted device identifiers; and allowing the authenticated wireless device to join the private WLAN in response to the device identifier being within the permitted device identifiers.

20. The handheld computing device of claim 17, wherein the gateway protocol to authenticate a device requesting to join the private WLAN, and in response to authentication by the gateway protocol of the requesting device, the gateway protocol to compare a device identifier of the authenticated requesting device to the device identifiers stored in memory to determine whether to allow the authenticated requesting device to join the private WLAN.

* * * * *